United States Patent
Osanai et al.

(10) Patent No.: US 7,352,483 B2
(45) Date of Patent: Apr. 1, 2008

(54) NETWORK IMAGE PROCESSING APPARATUS AND MONITORING APPARATUS

(75) Inventors: Akira Osanai, Yokohama (JP); Minoru Ozaki, Yokohama (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 755 days.

(21) Appl. No.: 10/176,001

(22) Filed: Jun. 21, 2002

(65) Prior Publication Data

US 2003/0002075 A1 Jan. 2, 2003

(30) Foreign Application Priority Data

Jul. 2, 2001 (JP) ............... 2001-200998

(51) Int. Cl.
*G06F 15/00* (2006.01)
*G06F 3/00* (2006.01)
(52) U.S. Cl. ............... 358/1.15; 358/434; 358/439; 710/19; 709/224
(58) Field of Classification Search .............. 710/15, 710/19; 709/223–226, 237, 217–219, 208–211; 358/1.12, 1.14, 1.15, 434, 436, 438, 439; 370/408, 346
See application file for complete search history.

(56) References Cited

U.S. PATENT DOCUMENTS

| | | | | |
|---|---|---|---|---|
| 5,651,006 A | * | 7/1997 | Fujino et al. | 370/408 |
| 5,822,535 A | * | 10/1998 | Takase et al. | 709/226 |
| 6,321,266 B1 | * | 11/2001 | Yokomizo et al. | 709/226 |
| 6,449,663 B1 | * | 9/2002 | Carney et al. | 710/15 |
| 6,633,393 B1 | * | 10/2003 | Fukano | 358/1.12 |
| 6,832,247 B1 | * | 12/2004 | Cochran et al. | 709/223 |
| 6,996,627 B1 | * | 2/2006 | Carden | 709/237 |
| 2002/0140962 A1 | * | 10/2002 | Oka | 358/1.14 |

\* cited by examiner

*Primary Examiner*—Douglas Q. Tran
*Assistant Examiner*—Chan S Park
(74) *Attorney, Agent, or Firm*—Greenblum & Bernstein, P.L.C.

(57) ABSTRACT

A number-of-commands counter counts number of commands received during a predetermined measurement period, which is timed by a timer. An access interval determiner determines command reception frequency from the count result, and decides on an optimum access interval time. An MIB update unit updates <access interval MIB> based on the optimum access interval time. An SNMP agent responds to an obtaining command and transmits <access interval MIB>. An MIB receiver receives <access interval MIB> and an MIB obtainer analyzes <access interval MIB> to recognize the access interval time. A timer setter sets the recognized access interval time at a timer as a timer setting.

1 Claim, 7 Drawing Sheets

NETWORK IMAGE PROCESSING APPARATUS AND MONITORING APPARATUS

BACKGROUND OF THE INVENTION

1. Field of the Invention

The present invention relates to a network image processing apparatus, a monitoring apparatus and a method for monitoring the network image processing apparatus.

2. Description of Related Art

Conventionally, personal computers (hereinafter referred to as PCs) are used to remotely monitor an image processing apparatus, such as printer, facsimile apparatus, copy machine, multifunction printer, etc. One of the protocols that are used for such remote monitoring is SNMP (Simple Network Management Protocol).

SNMP is a protocol to monitor and manage apparatuses that are connected to TCP/IP network, via network. SNMP is developed as a standard protocol for transmitting network managing information, such as HUB, which is a managing system (agent), to a managing system (manager).

When monitoring status of a network OA apparatus (e.g., no paper for printer) by a PC of the monitoring side, SNMP is extended to utilize since the SNMP specification does not define such status monitoring as a standard.

For remote monitoring of image processing apparatuses using conventional SNMP, the managing system inquires for status information in predetermined intervals, while the managed system replies by transmitting the current status information in accordance with the inquiry.

In such cases, as seen in a network printer system, in a network environment where multiple managing systems exist per only one managed system, inquiries from multiple managing systems are directed toward the managed system. Thus, inquiry conflicts become frequent and the processing demands on the managing system increase. As a result, the managing system often fails to receive replies to the inquiries and it becomes difficult to effectively perform remote monitoring on the monitored system from the monitoring system.

SUMMARY OF THE INVENTION

The present invention is provided in view of above-described problems. The object of the invention is to provide a network image processing apparatus and monitoring apparatus with which a monitoring apparatus can remotely monitor a network image processing apparatus effectively and securely.

To solve the problems, a unit is provided, which determines an optimum connection interval for inquiries from a monitoring apparatus, notifies the monitoring apparatus of the optimum value, and requests the monitoring apparatus to update interval setting that is kept by the monitoring apparatus, according to the connection conditions of the monitoring apparatus with the network image processing apparatus.

Accordingly, the monitoring apparatus connects with the interval that is proposed by the network image processing apparatus. Since this interval is an optimum interval according to the connection status of the monitoring apparatus, inquiry conflicts from the monitoring apparatus to the network image processing apparatus are eliminated, and the processing demands on the network image processing apparatus decrease. As a result, it is possible to prevent the situation when the monitoring apparatus is frequently incapable of receiving replies, and to remotely monitor the network image processing apparatus from the monitoring apparatus effectively and securely.

In this specification, connection status of a monitoring apparatus specifically includes a number of inquiries (commands) per a unit of time, and a number of connections made by a monitoring apparatus to a network image processing apparatus.

Also, in this specification, network apparatuses include all of the apparatuses that are connected to a TCP/IP network and perform data transmission/reception via the network. Network image processing apparatuses include network apparatuses that comprise at least one of image recorder and image scanner, and specifically include network printers, network multifunction printers, network scanners, network facsimiles, network connecting personal computers, etc.

Additionally, apparatuses that are managed by the SNMP including network apparatuses, are inclusively referred to as managed systems (agents). PCs that manage the managed system are altogether referred to as managing systems (managers).

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

Figure 1:
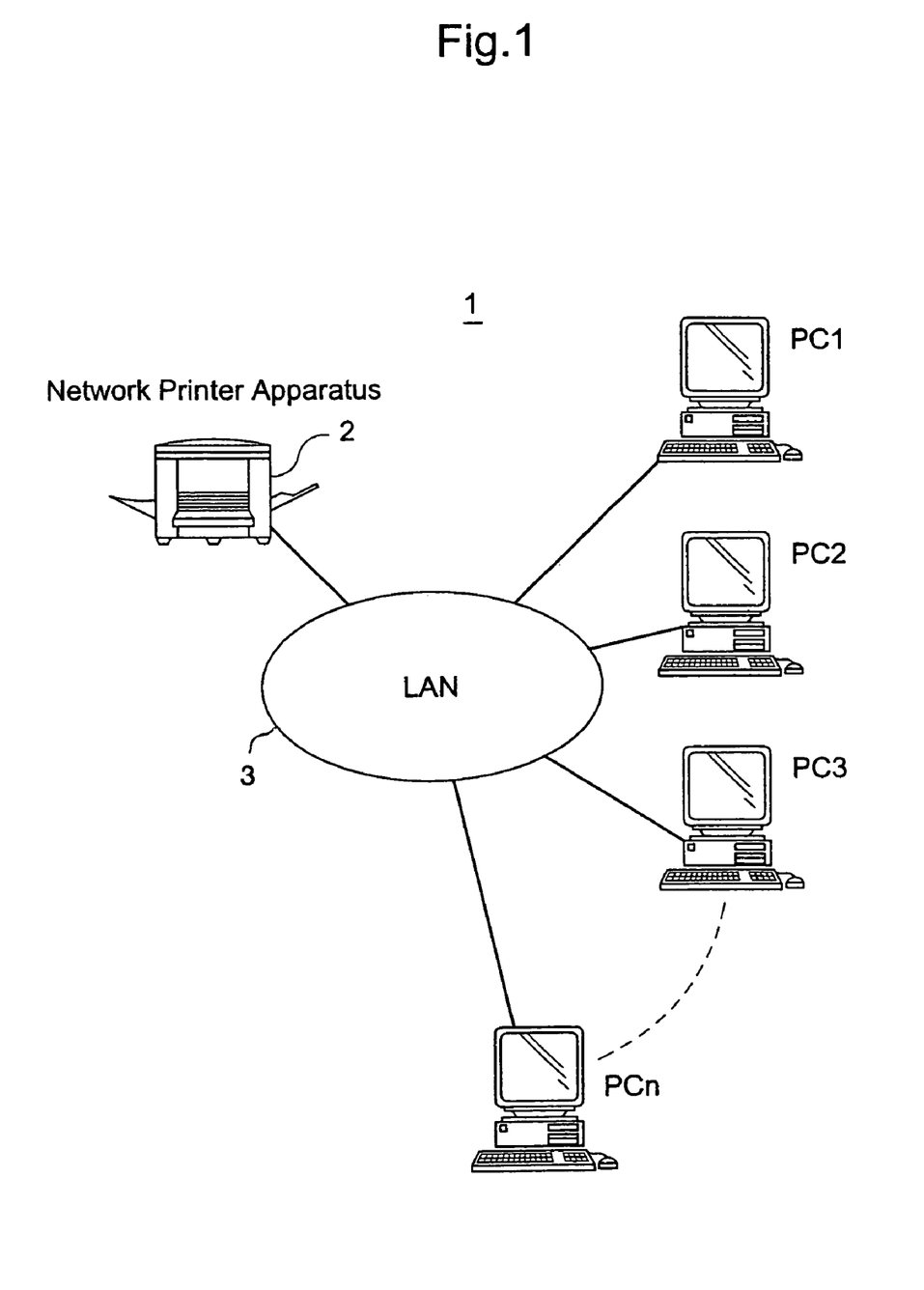
FIG. 1 is a general illustration of a remote monitoring system according to an embodiment of the present invention.

The embodiment of the present invention is explained in the following, in reference to the above-described drawings. FIG. 1 is a general illustration of a remote monitoring system according to an embodiment of the present invention.

In a remote monitoring system 1 of FIG. 1, a network printer apparatus 2, which is a managing system, is connected to multiple (n units) PC1-PCn, which is a managing system, via a LAN 3.

In this example, Ethernet cables are used for transmission paths of the LAN 3, however, the method is not limited to the same, as long as TCP/IP network is used as upper layer to utilize the SNMP for remote monitoring. That is, network transmission paths can be wired or wireless. IEEE 1394 network and Net Ware network are examples of the wired transmission path, while wireless LAN (IEEE 802.11b, etc.) and Bluetooth are examples of the wireless transmission path.

The network printer apparatus 2 and PC1-PCn are connected only via the LAN 3 in this embodiment, however, both can be connected via the Internet and WAN. Also, TCP/IP network is not the only network for this invention, as long as SNMP is not used for remote monitoring.

Figure 2:
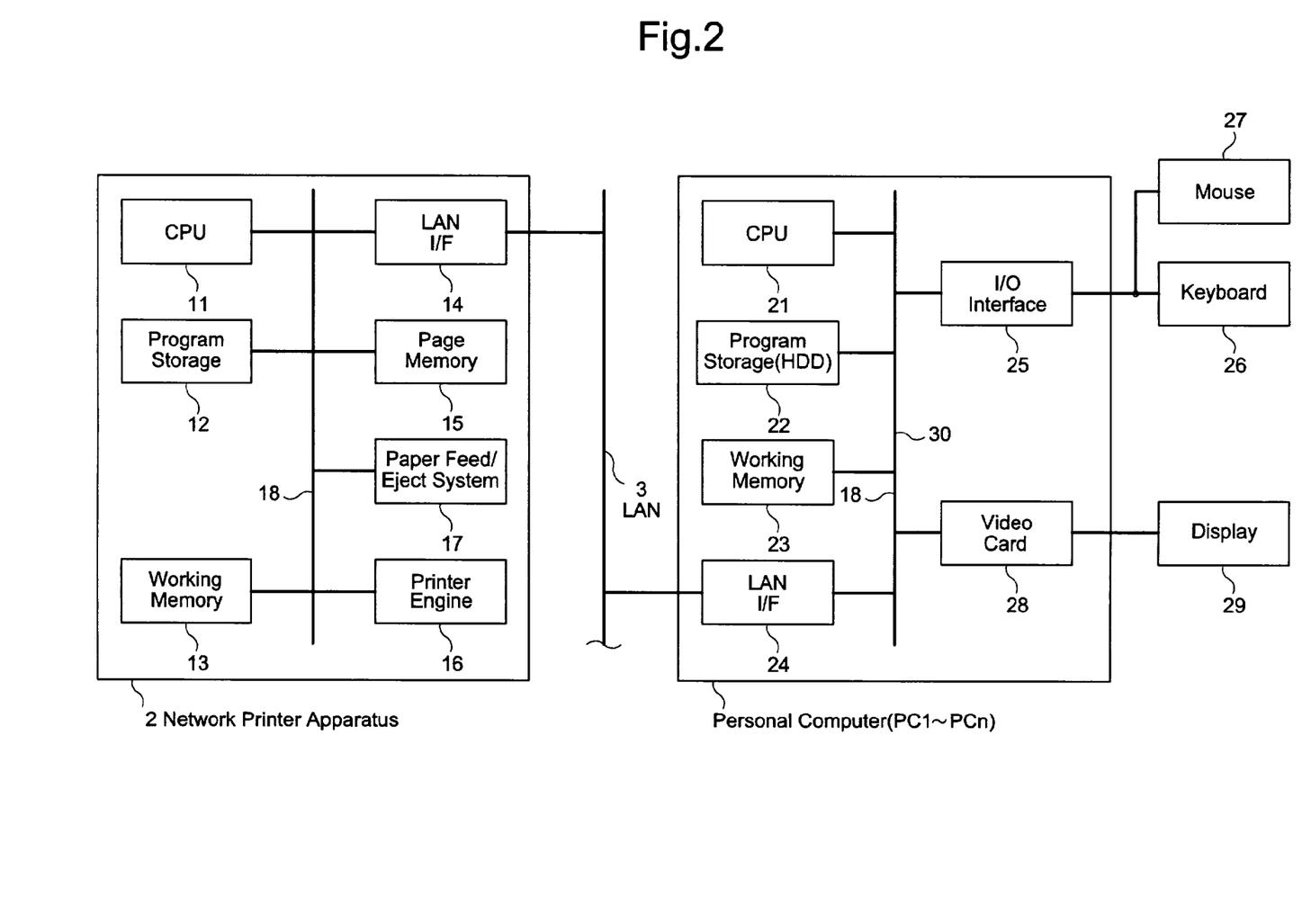
FIG. 2 is a block diagram illustrating a hardware configuration of a network printer apparatus and a personal computer, according to the embodiment of the present invention.

FIG. 2 is a block diagram illustrating a hardware configuration of a network printer apparatus and a personal computer, according to the embodiment of the present invention.

In the network printer apparatus 2, a CPU 11 executes programs and controls each unit of the apparatus. A program storage 12 stores programs that are executed by the CPU 11. A working memory 13 provides execution areas for the CPU 11. A LAN interface 14 is a circuit to handle data with external apparatuses via the LAN 3. A page memory 15 stores image data that is extended from printing data received from PC1-PCn. A printer engine 16 prints the image data extended in the page memory 15 on recording paper. A paper feed/eject system 17 feeds and ejects recording paper for the printer engine 16. The above units are connected to and controlled by the CPU 11 via a bus 18.

In PC1-PCn, a CPU 21 executes programs to control each unit of the apparatus. A program storage 22 stores programs that are executed by the CPU 21. Specifically, the program storage 22 is a hard disk drive (HDD) that stores operation system and application programs, which operates on the operation system. A working memory 23 provides execution areas of the CPU 21. A LAN interface 24 is a circuit to exchange data with external apparatuses via the LAN 3. An I/O interface 25 is a circuit to connect a keyboard 26 and mouse 27 as external input apparatuses. A video card 28 is a circuit for displaying data on a display 29. The above units are connected via a bus 30 to be controlled by the CPU 21.

Figure 3:
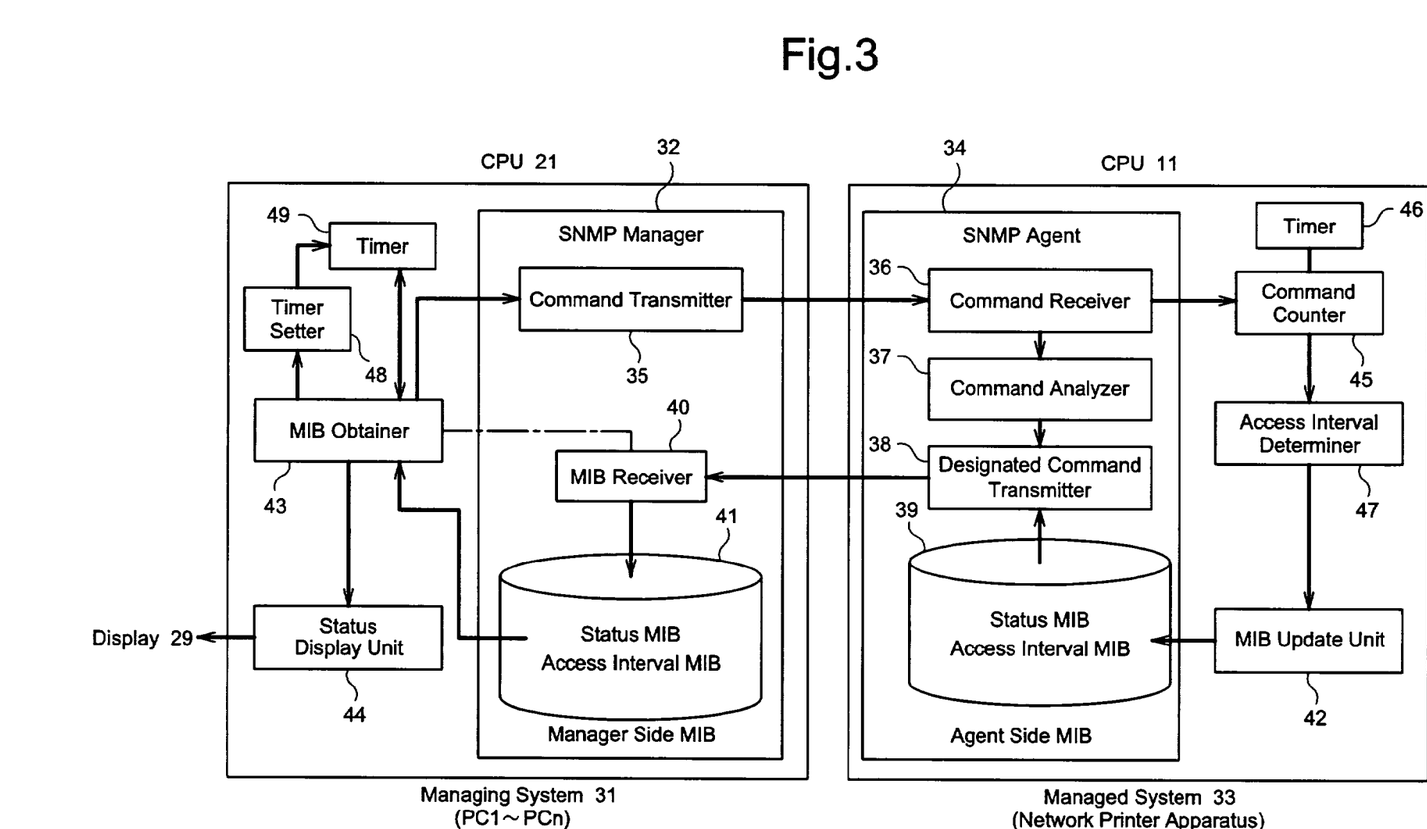
FIG. 3 is a general illustration of a relationship between a managing system and managed system of the remote monitoring system, according to the embodiment of the present invention.

FIG. 3 is a general illustration of a relationship between a managing system and managed system of the remote monitoring system, according to the embodiment of the present invention.

In a managing system 31, specifically in the program storage 22 of PC1-PCn, a program that operates as a SNMP manager 32 is stored, so that the CPU 21 can execute the SNMP manager 32. In a managed system 33, in particular, in the program storage 12 of the network printer apparatus 2, a program that operates as a SNMP agent 34 is stored, so that CPU 11 can execute the SNMP agent 34.

The SNMP manager 32 and SNMP agent 34 perform communication using the SNMP protocol via the LAN 3. In detail, a command transmitter 35 of the SNMP manager 32 transmits a command message <GetRequest-PDU> to the SNMP agent 34 and attempts to obtain information (MIB). To designate an MIB, an object ID is used. A command receiver 36 of the SNMP manager 32 receives <GetRequest-PDU>, and a command analyzer 37 analyzes the command message. A designated MIB transmitter 38 reads the information (MIB) designated by the SNMP manager 32 from an agent side MIB 39, and transmits the MIB to the SNMP manager 32 by using the response message <GetResponse-PDU>. In the SNMP manager 32, an MIB receiver 40 receives the reply message and updates the corresponding object of the manager side MIB 41, based on the transmitted information. In this embodiment, PDU stands for a "protocol data unit" and represents a block that configures a message.

In the remote monitoring system 1 according to the embodiment of the invention, in order to monitor the status of the network printer apparatus 2 using the SNMP, both the manager side MIB 41 and agent side MIB 39 set <status MIB> that is a private MIB indicating status information of the network printer apparatus 2. Also, the network printer apparatus 2 comprises a MIB update unit 42. The MIB update unit 42 obtains status information of individual units of the network printer apparatus 2 and updates the corresponding status MIB. Status information includes out of paper, paper jam, low toner, open door, amount of communication, output number of pages, etc.

In PC1-PCn, an MIB obtainer 43 orders the command transmitter 35 of the SNMP manager 32 to transmit command message requesting the SNMP agent 34 for an MIB (hereinafter referred to as obtaining command). The MIB obtainer 43 orders transmission of the obtaining command, when a predetermined MIB obtaining condition establishes.

In this embodiment, the MIB obtainer 43 attempts to obtain predetermined multiple MIBs, when an MIB obtaining condition establishes. In detail, the MIB obtainer 43 delivers object IDs that individually designate multiple MIBs to be obtained (hereinafter referred to as "obtaining ID" separately, and "obtaining IDs" altogether), to the command transmitter 35.

The command transmitter 35 generates a obtaining command from the obtaining OIDs received from the MIB obtainer 43 and transmits the command. In the embodiment, from the point of transmitting an obtaining command for the first obtaining OID of the obtaining OIDs, to the point of transmitting a obtaining command for the last obtaining OID is considered as one access.

In response to the obtaining command for the status MIB, the SNMP agent 34 transmits an MIB of the agent side MIB 39 to the SNMP manager 32. The obtained MIB by the SNMP manager 32 in the above procedure is hereinafter referred to as obtained MIB.

When the obtained MIB is a <status MIB>, MIB receiver 40 of the SNMP manager 32 analyzes the obtained MIB, recognizes the status information, and transmits the status information to a status display unit 44. The status display unit 44 displays the status information on the display 29, and notifies the operators of PC1-PCn of the processing contents and errors at the network apparatus 2.

On the other hand, in the network printer apparatus 2, a command counter 45 is provided, that counts the number of received MIB obtaining commands at the command receiver 36 of the SNMP agent 34. The command counter 45 counts the number of the commands that are in a predetermined measurement period, which is measured by a timer 46, and notifies an access interval determiner 47 of the count result.

The access interval determiner 47 determines command reception frequency from the count result, and determines an optimum access interval time. As an example of the method, the number of requests that are received during a measurement period is divided by the number of managers that sent the requests during the measurement period, in order to calculate the number of requests per one manager. The processing time for a response for one request as an agent apparatus can be set as a constant from a calculation of an apparatus component (processing speed, memory capacity of the CPU, etc.) and from an actual measurement. By multiplying the above number of request per one manager with the above constant, the minimum interval for the next request transmission for one manager can be determined. When actually giving an MIB to the manager, the value is given by multiplying the value for each manager that is obtaining the MIB. In other words, after an interval is set, the calculated value is given to the manager that is obtaining the value (MIB) first, and the doubled calculated value is given to the second manager that is obtaining the MIB next. This procedure continues until the next measurement is completed. Accordingly, the request transmission timing of each manager is delayed, and requests are orderly made from each manger by time-sharing. Therefore, the agent process works more efficiently. As a different method, several time intervals can be preset. For example, by having time intervals with multiple levels, manager can normally receive the shortest time. During the time span from the point when the number of requests has exceeded the processing capacity of the agent, until when the number of requests resumes within the processing capacity, each time of different levels can be given to each manger in the order of accessing to obtain the interval time, so as to delay the timing. The access interval determiner 47 delivers the optimum access interval time to the MIB update unit 42. Based on the received access interval time, MIB update unit 42 updates <access interval MIB> that is defined in the agent side MIB 39.

The MIB obtainer 43 includes obtaining OIDs that designate <access interval MIB> in the obtaining OIDs. Accordingly, the command transmitter 35 transmits obtaining command that requests <access interval MIB>. In response to the obtaining command, the SNMP agent 34 transmits <access interval MIB>. In the managing system 31, the MIB receiver 40 receives <access interval MIB> and updates <access interval MIB> that is defined in the manager side MIB 41. By analyzing the <access interval MIB>, the MIB obtainer 43 recognizes the access interval time. The timer setter 48 sets the recognized access interval time as a timer setting, and set the same for the timer 49.

After the processing for all of the reply is finished, the MIB obtainer 43 starts the timer 49. The MIB obtainer 43 directs the command transmitter 35 for the next command transmission, when the timer 49 measures the set access interval time.

Additionally, the MIB obtainer 43, timer setter 48, and status display unit 44 of the managing system side, and MIB update unit 42, command counter 45, and access interval determiner 47 of the managed system side are functions that becomes available by the programs executed by the CPU 11 and CPU 21 respectively. These programs can be parts of the programs of SNMP manager 32 and SNMP agent 34, or they can be external programs.

Figure 4:
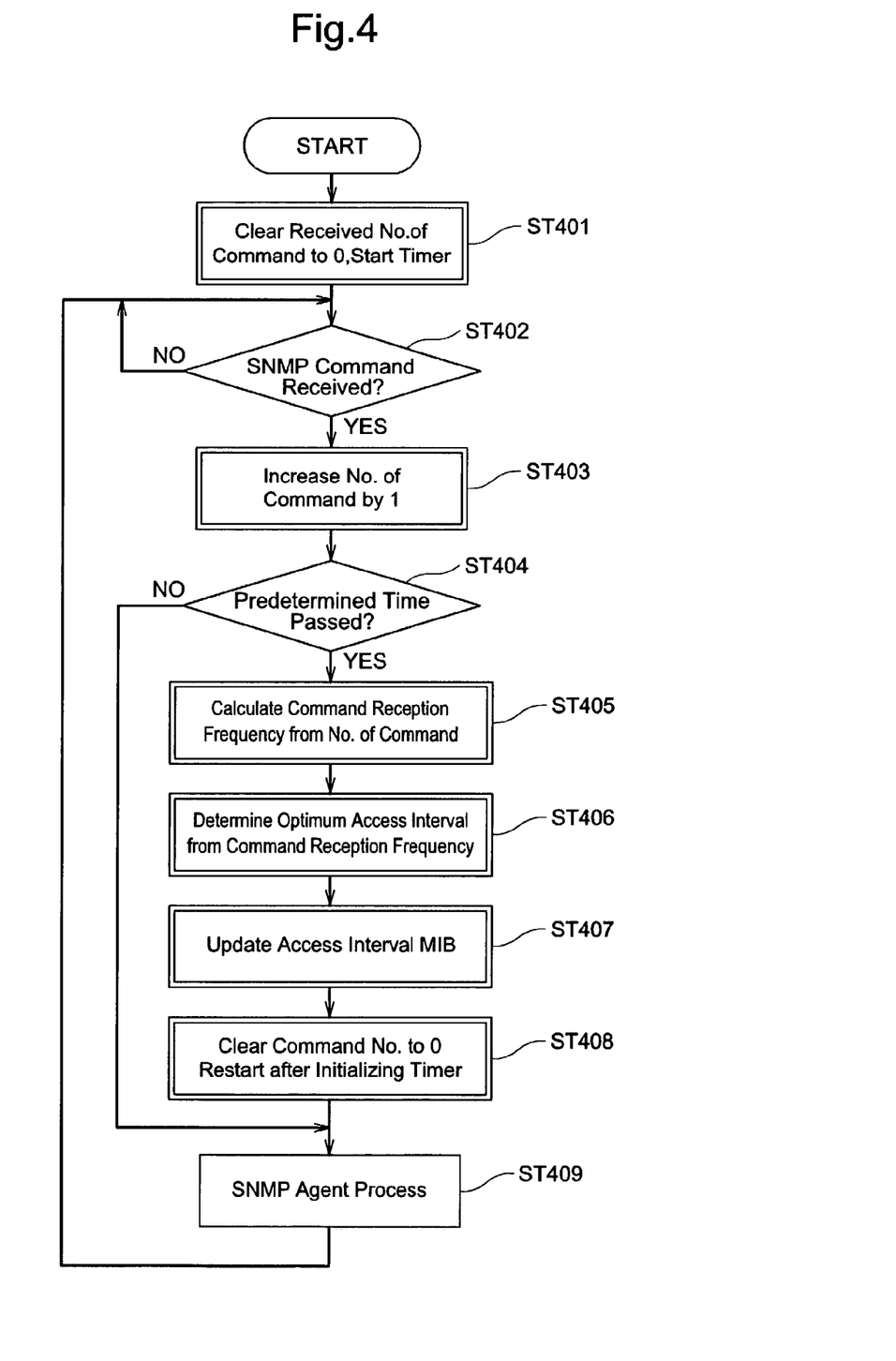
FIG. 4 is a flowchart illustrating an operation of the network printer apparatus as an SNMP agent, according to the embodiment of the present invention.

FIG. 4 is a flowchart illustrating an operation of the network printer apparatus as an SNMP agent, according to the embodiment of the present invention.

In the network printer apparatus 2, when the power is turned on and the initialization of the apparatus and network is completed, the program of managed system 33 as shown in FIG. 3 starts up. Then, the command counter 45 initially clears the number of command to zero, and starts the timer 46 (Step 401). Next, the command receiver 36 of the SNMP agent 34 waits for SNMP command reception (Step 402). If there is a SNMP command reception, the command counter 45 counts up the number of commands by one (Step 403). Further, by referring to the timer 46, the command counter 45 determines whether the predetermined measurement period has passed since the timer 46 started the counts (Step 404).

If the answer is "YES" at Step 404, the command counter 45 delivers the number of commands to the access interval determiner 47. The access interval determiner 47 then calculates command reception frequency from the number of commands (Step 405). Specifically, the command reception frequency is calculated, for example, as a number of commands per time unit (e.g., per minute), by dividing the counted number of command by the measurement period.

Next, the access interval determiner 47 determines an access interval that is optimum for the calculated command reception frequency (Step 406). The determination of access interval is performed specifically in the described method above.

Further, the access interval determiner 47 updates the access interval MIB that is defined by the agent side MIB 39 in the determined access interval time (Step 407). Subsequently, the command counter 45 clears the number of commands to zero, and restarts the timer 46 after initializing the same (Step 408).

If the answer is "NO" at the Step 404, and after initializing the number of commands and the timer 46 at Step 408, the SNMP agent 34 performs a process that corresponds to the obtained command received at the command receiver 36, and replies to the SNMP manager 32 (Step 409).

Accordingly, the network printer apparatus 2 determines access interval time that is optimum for the number of command per time unit (command reception frequency) from PC1-PCn, transmits the determined access interval time to PC1-PCn, and requests PC1-PCn to actively perform command transmission accordingly.

Figure 5:
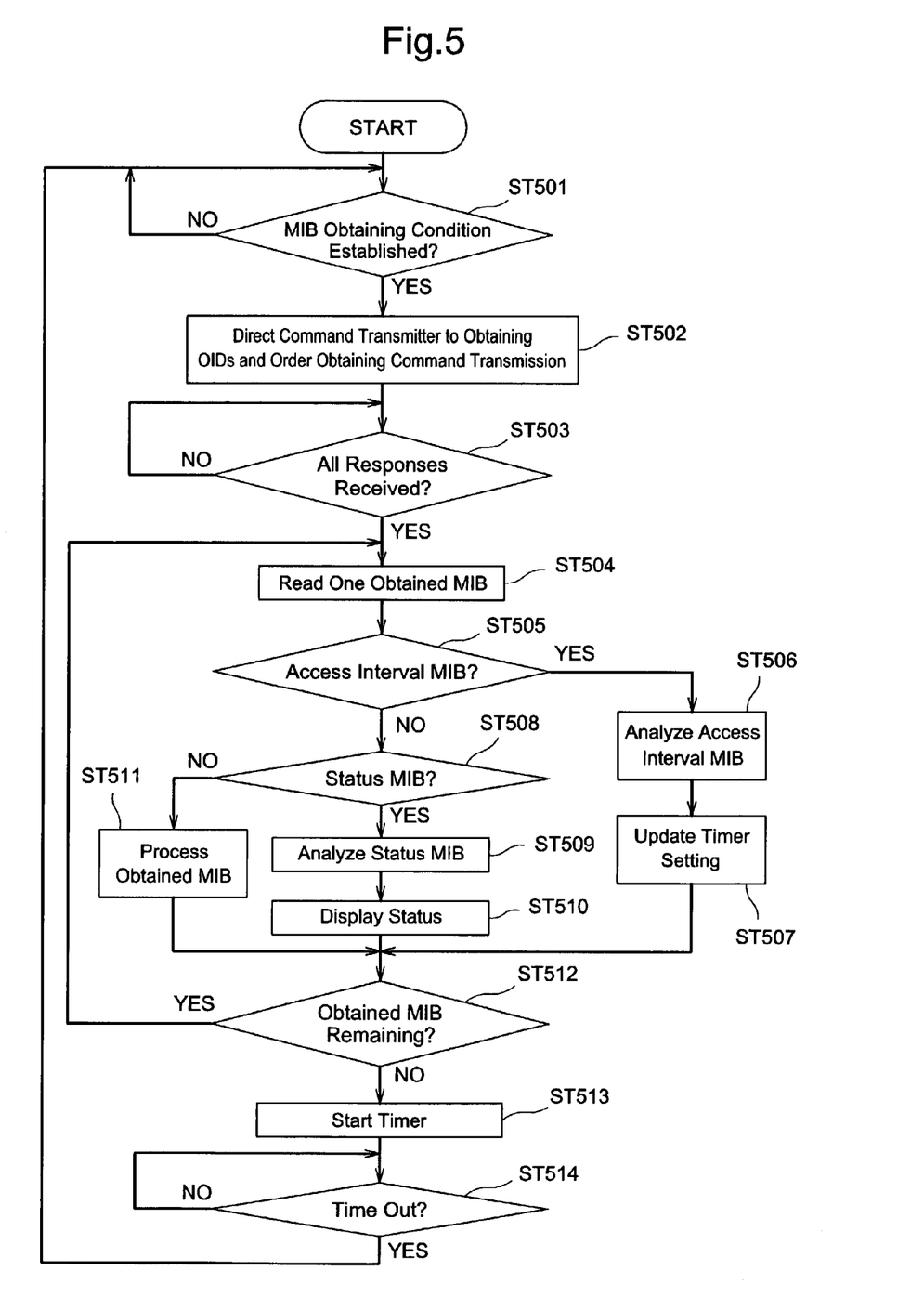
FIG. 5 is a flowchart illustrating an operation of the personal computer as an SNMP manager, according to the embodiment of the present invention.

FIG. 5 is a flowchart illustrating an operation of the personal computer as an SNMP manager, according to the embodiment of the present invention.

When PC1-PCn are turned on, and the initialization of the apparatus and the network is completed, the program of the managing system 31 in FIG. 3 is started. Then, the MIB obtainer 43 determines whether the MIB obtaining condition is established (Step 501). The MIB obtaining conditions for periodically obtaining status information include monitoring remaining amount of paper and toner for a printer, for example. For frequently obtaining status information, the MIB obtaining conditions also include a situation when an immediate resolution of an obstacle is needed, for example, paper jam, and it is necessary to repeatedly monitor the printer until it resolves the problem or to wait until the printing job is finished. The above conditions include a situation for automatically obtaining the information according to the schedule that is pre-programmed by the manager, and for manually obtaining the information by a network manager (human who operates and manages the manager).

If the answer is "NO" at Step 501, the process waits until the condition is established. When the answer is "YES" at Step 501, the MIB obtainer 43 directs the command transmitter 35 to the obtaining OIDs and orders to transmit obtaining command (Step 502). According to the order, the command transmitter 35 transmits the obtaining command to the SNMP agent 34.

The MIB obtainer 43 then checks whether all responses are received from the SNMP agent 34 (Step 503). If the answer is "NO", the MIB obtainer 43 checks again. Accordingly, the MIB obtainer 43 monitors the MIB receiver 40 and waits until all of the responses are received.

Upon receiving all of the responses, the MIB obtainer 43 reads an MIB one by one, which is obtained from the manager side MIB 41 (Step 504). The MIB obtainer 43 further determines whether the MIB that is read is <access interval MIB> (Step 505). If the answer is "YES", the MIB obtainer 43 analyzes <access interval MIB> to recognize the access interval time (Step 506). The MIB obtainer 43 further transmits the access interval time to the timer setter 48. The timer setter 48 updates the timer setting of the timer 49, with the received access interval time (Step 507).

Conversely, if the answer is "NO" at Step 505, the MIB obtainer 43 determines whether the MIB that is read is <status MIB> (ST 508). If the answer is "YES", the MIB obtainer 43 analyzes <status MIB> and recognizes the status information of the network printer apparatus 2 (Step 509). Then, the MIB obtainer 43 transmits the status information to the status display unit 44, so that the status display unit 44 displays the received status information on the display 29 (Step 510).

If the answer is "NO" for both Steps 501 and 508, a process for the obtained MIB is performed (Step 511). This process includes changing the managing content of the manager, such as information of configuration of an apparatus that does not frequently change as an apparatus (number of cassettes, paper size of each cassette, and size of equipped memory). For example, if the cassette 1 changes the paper size from A4 to B4, managing for B4 size paper is required. Similarly, if number of cassette changes from 2 to 3-4, paper managing for cassettes 3 and 4 is required. Therefore, it is required to newly obtain such status MIB.

When the Steps 507, 510 and 511 are completed, whether there are any remaining obtained MIB is checked (Step 512). If the answer is "YES", the control returns to Step 504 and performs the process for the obtained MIB at Steps 505-511. If the answer is "NO", the timer 49 is started (Step 513), and the control checks whether the set access interval time has expired and it is time-out (Step 514). Accordingly, the determination is repeated until it is time-out, and it is possible to delay the access from the managing system 31 to the managed system 33 for the access interval time. Therefore, it is possible for PC1-PCn to perform command transmission with the intervals according to the access interval time that is decided and proposed by the network printer apparatus 2.

Figure 6:
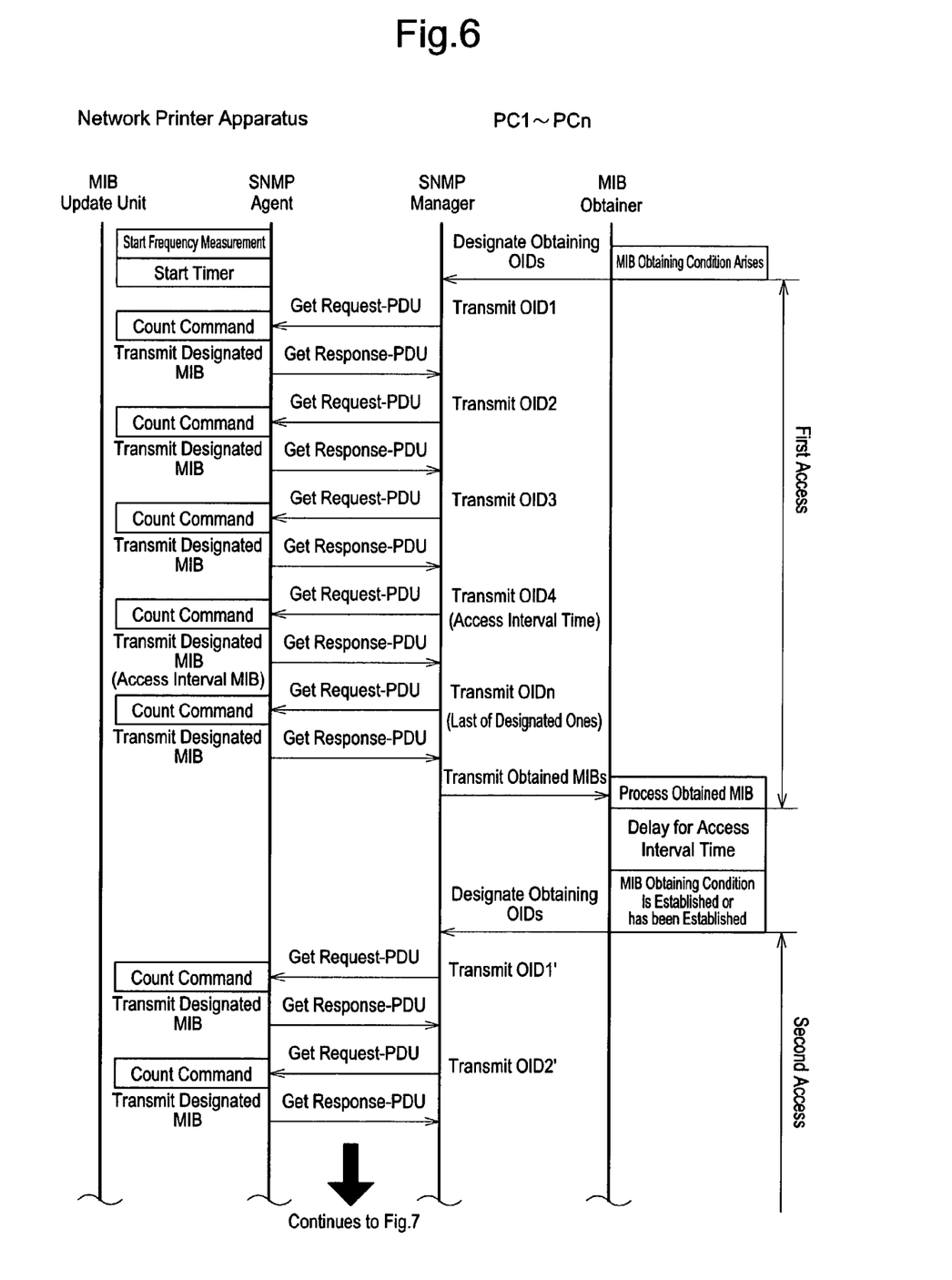
FIG. 6 illustrates a first half of SNMP sequence between the network printer apparatus and the personal computer, according to the embodiment of the present invention.
Figure 7:
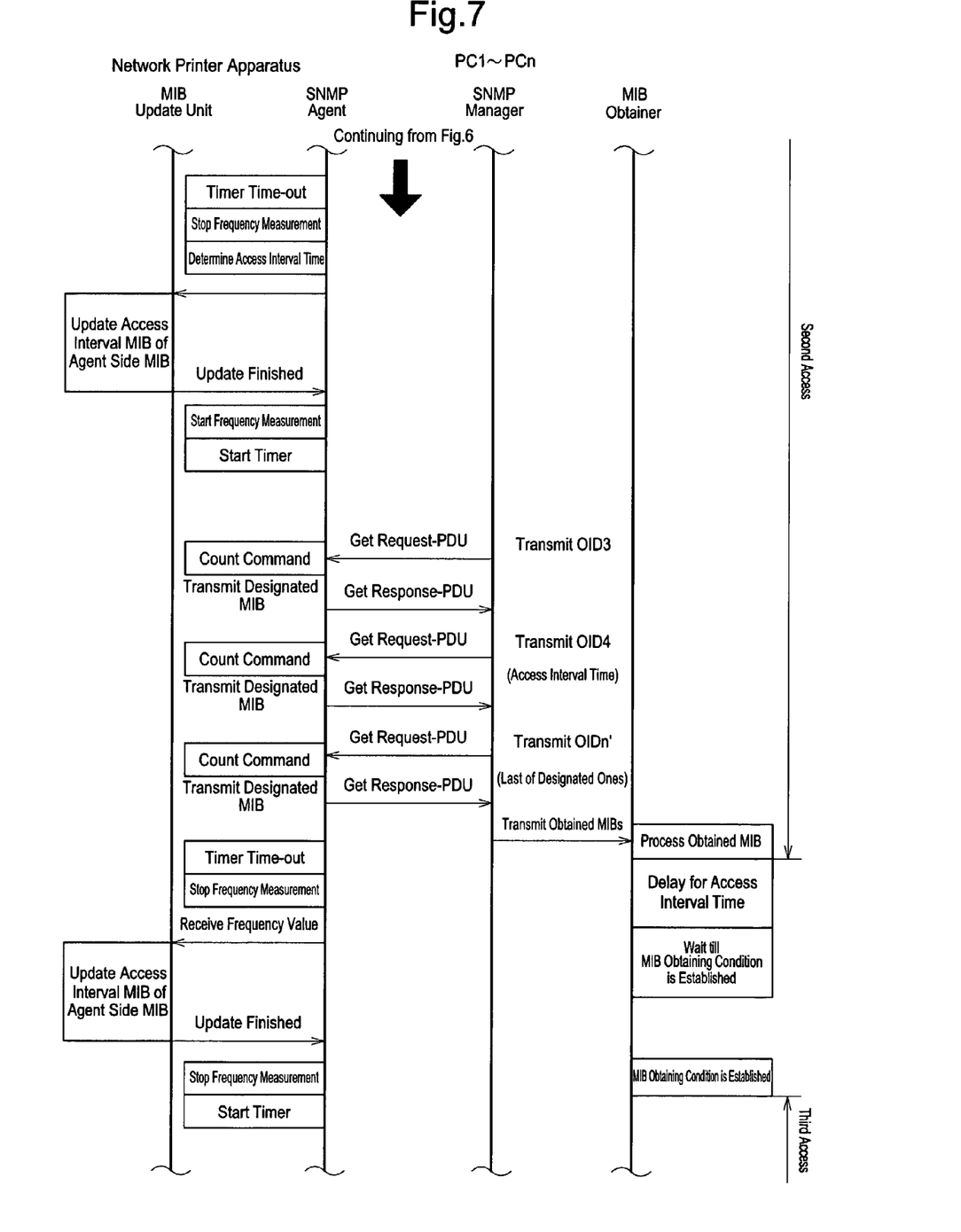
FIG. 7 illustrates a second half of the SNMP sequence between the network printer apparatus and the personal computer, according to the embodiment of the present invention.

FIGS. 6 and 7 illustrate SNMP sequence between the network printer apparatus and the personal computer, according to the embodiment of the present invention.

The sequence shown in FIGS. 6 and 7 only illustrates operation of one PC of PC1-PCn. However, PC1-PCn can actually transmit obtaining commands to the network printer apparatus 2 simultaneously, and the SNMP agent 34 can receive obtaining commands other than what is shown in this sequence.

The MIB obtainer 43 of PC1-PCn designates multiple object IDs (OIDs) that indicate MIB to be obtained to the SNMP manager 32 (Step 601). In this embodiment, the MIB to be obtained is <status MIB>, and their object IDs are referred to as "obtaining OIDs". The SNMP manager 32 transmits <GetRequest-PDU> one by one, which is a obtaining command message requesting for the MIB that is designated by the obtaining OIDs.

On the other hand, the network printer apparatus 2 starts the command reception frequency measurement and start the timer 46. The SNMP agent 34 counts up the number of command every time an obtaining command is received from the SNMP manager 32, and transmits a reply message <GetResponse-PDU> that transmits the MIB designated by the obtaining command.

The designated OIDs include status MIB that defines the status information of the network printer apparatus 2 and OID4, as designating OID, that designates access interval MIB. The SNMP agent 34 transmits <access interval MIB> in the agent side MIB 39, according to the obtaining command that designates OID4.

Upon receiving responses regarding all of the obtaining OIDs of OID1-OIDn (hereinafter referred to as obtained MIBs), the SNMP manager 32 transmits the obtained MIBs to the MIB obtainer 43. The MIB obtainer 43 then processes each MIB of the obtained MIBs. Specifically, the MIB obtainer 43 analyzes <status MIB>, recognizes the status information of the network printer apparatus 2, transmits the data to the status display unit 44, and displays the status on the display 29. The process for <access interval MIB> is the same as explained above.

As explained in Steps 513 and 514 of FIG. 5, access to the SNMP agent 34 is delayed for the amount of access interval time. When the MIB obtaining condition establishes again thereafter, or if the MIB obtaining condition has been established already, the MIB obtainer 43 starts the second access.

When the timer 46 of the network printer apparatus 2 has a time-out, the frequency measurement is stopped, the command counter 45 determines the command reception frequency from the counted number of commands, and determines an access interval time that is optimum for the command reception frequency. The MIB update unit 42 then updates <access interval MIB> of the agent side MIB 39 with the determined access interval time. Accordingly, at the next access, <access interval MIB> that is updated as a response to the OID4 is transmitted to PC1-PCn. Based on the updated <access interval MIB>, PC1-PCn updates the timer setting of the timer 49. Consequently, PC1-PCn are able to delay their next and subsequent accesses for an access interval time that is optimum for the command reception frequency.

As described in the above embodiment, according to the monitoring method of network printer apparatus 2, reception frequency of obtaining command from PC1-PCn toward the network printer apparatus 2 is measured, access interval time optimum for the reception frequency is determined and notified to PC1-PCn, and timer setting of the timer 49 is updated according to the access interval time. Accordingly, accesses to the network printer apparatus 2 from PC1-PCn are performed with intervals that are optimum to the obtaining command frequency. Therefore, it is possible to avoid inquiry conflicts from PC1-PCn and to decrease the processing demands on the CPU 21 of the network printer apparatus 2. As a result, it is possible to prevent frequent problems with PC1-PCn being incapable of receiving replies. It also makes it possible to securely and effectively monitor the network printer apparatus 2.

In the present embodiment, optimum access interval time is determined based on the reception frequency of the obtaining command. However, this invention is not limited to this method, and it can be suggested that the optimum access interval time is determined based on the number of PC1-PCn that are connected to the network printer apparatus 2 via the LAN 3 (hereinafter referred to as connecting number "n"). The connecting number "n" can be manually input to the network printer apparatus 2 by the network manager. Also, by setting a unit that detects the IP address of PC1-PCn transmitting a packet to the network printer apparatus 2, and by counting the IP address, the connecting number "n" can be obtained from the counted value.

Whether determining the optimum access interval time is either based on the frequency of the obtaining command, i.e., inquires made by the SNMP, or on connecting number "n" of PC1-PCn, determination for the optimum access interval time is still made based on the connection status of PC1-PCn.

Remote monitoring of the network apparatuses using the SNMP is performed under a premise that the monitoring system and managing system communicate one on one. Therefore, there is no consideration of situations when multiple monitoring systems send inquiries to the managing system and such inquiries conflict one another. However, the present invention is the first to solve various problems that arise in the system shared by multiple client terminals (PC1-PCn), which perform monitoring of an apparatus such as network image processing apparatus.

Also, in this embodiment, PC1-PCn display received status information on the display 29, however, other methods such as voice input, e-mail notification, and facsimile communication can be used to notify status information. Also, the managing system is not limited to personal computers.

The present invention can be implemented, as it is obvious to person skilled in the art, by using general digital computers and microprocessors that are available in the market, and programmed according to the technology described in the embodiment. Also, as it is obvious to person skilled in the art, the present invention includes computer programs that are programmed by the person skilled in the art, based on the technology described in the above embodiment, i.e., programs in which computers operate as units that compose network image processing apparatus and managing apparatus according to the present invention.

Also, the scope of the present invention includes computer program products that serve as memory media including sending commands that are usable to program computers that executes the present invention. Such memory media include floppy disks, laser disks, CDROM and disks such as magnetic disks, ROM, RAM, EPROM, EEPROM, magnetic laser cards, memory cards and DVD, however, the memory media is not limited to the above.

The present invention is not limited to the above-described embodiments, and various variations and modifications may be possible without departing from the scope of the present invention.

This application is based on the Japanese Patent Application No. 2001-200998 filed on Jul. 2, 2001, entire content of which is expressly incorporated by reference herein.

What is claimed is:

1. A network printing apparatus that communicates with at least a first monitoring apparatus and a second monitoring apparatus via a network, comprising:

an inquiry receiver that receives a first inquiry from the first monitoring apparatus regarding status information of the network printing apparatus and a second inquiry from the second monitoring apparatus regarding the status information of the network printing apparatus;

a status information transmitter that transmits the status information to the first monitoring apparatus and the second monitoring apparatus in response to said first inquiry and said second inquiry, respectively;

an interval determiner that determines a first interval value for the first monitoring apparatus and a second interval value for the second monitoring apparatus according to a frequency of the first inquiry from the first monitoring apparatus and a frequency of the second inquiry from the second monitoring apparatus; and an interval value transmitter that transmits the first interval value and the second interval value to the first monitoring apparatus and the second monitoring apparatus, respectively, the first monitoring apparatus accessing said network printing apparatus according to the first interval value, and the second monitoring apparatus accessing said network printing apparatus according to the second interval value, wherein the first interval value differs from the second interval value.

* * * * *